United States Patent
Klomberg (10) Patent No.: US 10,622,601 B2
(45) Date of Patent: Apr. 14, 2020

(54) BATTERY MODULE CARRIER, BATTERY SYSTEM AND USE OF A MODIFIED H-BEAM AS BATTERY MODULE CARRIER

(71) Applicant: Samsung SDI Co., Ltd., Yongin-si, Gyeonggi-do (KR)

(72) Inventor: Stephan Klomberg, Graz (AT)

(73) Assignee: Samsung SDI Co., Ltd., Yongin-si (KR)

( * ) Notice: Subject to any disclaimer, the term of this patent is extended or adjusted under 35 U.S.C. 154(b) by 209 days.

(21) Appl. No.: 15/721,092

(22) Filed: Sep. 29, 2017

(65) Prior Publication Data
US 2018/0108887 A1    Apr. 19, 2018

(30) Foreign Application Priority Data
Oct. 13, 2016    (EP) ..................................... 16193713

(51) Int. Cl.
| | |
|---|---|
| *H01M 2/10* | (2006.01) |
| *H01M 10/60* | (2014.01) |
| *H01M 10/613* | (2014.01) |
| *H01M 10/625* | (2014.01) |
| *H01M 10/6556* | (2014.01) |

(52) U.S. Cl.
CPC ....... *H01M 2/1077* (2013.01); *H01M 2/1016* (2013.01); *H01M 10/60* (2015.04); *H01M 10/613* (2015.04); *H01M 10/625* (2015.04); *H01M 10/6556* (2015.04); *H01M 2220/20* (2013.01)

(58) Field of Classification Search
None
See application file for complete search history.

(56) References Cited

U.S. PATENT DOCUMENTS

| | | | | |
|---|---|---|---|---|
| 6,085,854 A | * | 7/2000 | Nishikawa | B60K 1/04 180/68.5 |
| 6,516,954 B2 | * | 2/2003 | Broome | H05K 7/186 211/26 |
| 2010/0216004 A1 | | 8/2010 | Yoon | |
| 2013/0207459 A1 | * | 8/2013 | Schroder | H01M 2/1077 307/10.1 |
| 2014/0079968 A1 | | 3/2014 | Schmidt et al. | |
| 2018/0102576 A1 | * | 4/2018 | Yamamoto | H01M 10/625 |

FOREIGN PATENT DOCUMENTS

| | | |
|---|---|---|
| DE | 10 2012 218 082 A1 | 4/2014 |
| KR | 10-2010-0096994 A | 9/2010 |
| KR | 20-2011-0001936 U | 2/2011 |
| KR | 10-2014-0037773 A | 3/2014 |

OTHER PUBLICATIONS

Extended European Search Report in corresponding European Application No. EP 16193713.1, dated Dec. 23, 2016, 6 pages.

* cited by examiner

*Primary Examiner* — Lucas J. O'Donnell
(74) *Attorney, Agent, or Firm* — Lewis Roca Rothgerber Christie LLP (57) ABSTRACT

A battery module carrier includes: an H-beam including an upper flange, a web, and a lower flange; a first coolant hollow in the upper flange and extending along substantially an entire length of the upper flange; and a second coolant hollow in the web and extending along an entire length of the web.

21 Claims, 3 Drawing Sheets

BATTERY MODULE CARRIER, BATTERY SYSTEM AND USE OF A MODIFIED H-BEAM AS BATTERY MODULE CARRIER

CROSS-REFERENCED TO RELATED APPLICATION

This patent application claims priority to and the benefit of European Patent Application No. 16193713.1, filed on Oct. 13, 2016 in the European Patent Office, the content of which is incorporated herein by reference in its entirely.

BACKGROUND

1. Field

Aspects of embodiments of the present invention relate to battery module carrier and a battery system.

2. Description of the Related Art

A rechargeable or secondary battery differs from a primary battery in that it is designed to be repeatedly charged and discharged, while the latter provides an irreversible conversion of chemical to electrical energy. Low-capacity rechargeable batteries are used as power supplies for small electronic devices, such as cellular phones, notebook computers, and camcorders, while high-capacity rechargeable batteries are used as power supplies for hybrid vehicles and the like.

Generally, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery via an electrochemical reaction of the positive electrode, the negative electrode, and the electrolyte solution. The shape of the case, for example, a cylindrical or rectangular case, depends on the battery's intended purpose.

A plurality of rechargeable batteries (e.g., a plurality of unit battery cells) may be used to form a battery module. The unit battery cells in the battery module are coupled to each other in series and/or in parallel so as to provide high energy density, suitable for, as an example, driving a motor of a hybrid vehicle. For example, the battery module is formed by interconnecting the electrode terminals of the plurality of unit battery cells, the number of which depends on a desired amount of power, to realize a high-power rechargeable battery for, as an example, an electric vehicle.

Battery modules may have a block design or a modular design. In the block design, each unit battery cell is coupled to one common current collector (e.g., one common current collector structure), and a battery management system and the unit battery cells are arranged in a housing. In the modular design, a plurality of battery cells are connected to each other to form submodules, and a plurality of submodules are connected to each other to form the battery module. In the modular design, different battery management functions may be provided on module and/or submodule levels, which increases the flexibility of the battery module in terms of, for example, interchangeability.

To form a battery system, one or more battery modules are mechanically and electrically integrated, equipped with a thermal management system, and configured to communicate with one or more electrical consumers or electrical devices. To provide such features, the battery system may include a battery management unit (BMU) and/or a battery disconnect unit (BDU).

At least two different the electrical integration configurations of submodules in the battery module having the modular design are contemplated. First, the submodules, each including a plurality of cells connected to each other in parallel, are connected to each other in series (XsYp), or second, the submodules, each including a plurality of cells connected to each other in series, are connected to each other in parallel (XpYs). XsYp-type submodules provide high voltages, but the voltage level of each individual cell should be controlled individually. Thus, wiring complexity in the XsYp-type submodules is relatively high. In the XpYs-type submodules, the voltage levels of the cells connected to each other in parallel are automatically balanced (e.g., are naturally balanced), and thus, it is generally sufficient to control the voltage on the submodule level. Thus, wiring complexity in the XpYs-type submodules is reduced. In submodules having cells that are connected to each other in parallel, the capacitance of the cells add up, and thus, the XpYs-type submodules generally include relatively low-capacitance cells.

The thermal management system is provided to safely use the battery module by efficiently emitting, discharging, and/or dissipating heat generated by the rechargeable batteries. If the heat emission/discharge/dissipation is not sufficiently performed, temperature deviations occur between respective battery cells, such that the battery module no longer generates a desired amount of power. In addition, an increase in the internal temperature of the battery cells may lead to abnormal reactions occurring therein such that charging and discharging performance of the rechargeable batteries deteriorates and the life-span of the rechargeable batteries is shortened. Thus, cooling devices for effectively emitting/discharging/dissipating heat from the battery cells are generally provided in battery systems.

To meet the dynamic power demands of various electrical consumers (e.g., electrical devices) connected to the battery system, static control of battery power output and charging is generally insufficient. Thus, a steady exchange of information between the battery system and controllers of the electrical consumers may be provided. Important information includes, for example, the battery system's actual state of charge (SoC), potential electrical performance, charging ability, and internal resistance as well as actual or predicted power demands or surpluses of the consumers.

Mechanical integration requires appropriate mechanical connection of the individual components amongst themselves and to a structure of the system that provides the electrical consumers, for example, a vehicle. These connections are designed to remain functional and safe throughout the average service life of the battery system and under the stresses encountered during use of thereof, such as the use of the vehicle to which the battery system is connected. At the same time, installation space and interchangeability considerations must be made, especially in mobile applications.

Mechanical integration of battery modules may be achieved by providing a carrier plate (e.g., a ground plate) and by positioning individual battery cells or submodules thereon. Fixing the battery cells or submodules to the carrier plate may be achieved by fitting components thereof to depressions in the carrier plate, by mechanical interconnectors, such as bolts or screws, or by confining the cells or submodules. Confinement may be achieved by fastening side plates to lateral sides of the carrier plate and/or by providing a further carrier plate atop the battery cells or submodules and fixing it to the first carrier plate and/or side plates. Thus, multi-level battery modules may be constructed, and the carrier plates and/or side plates may include coolant ducts for cooling the cells or submodules.

Mechanical integration of the battery submodules may be achieved by using mechanically reinforced electrical connectors or by fastening the battery cells onto carrier beams or struts and additionally to the electrical connectors. Additionally or alternatively, the submodules may be arranged in individual casings covering some or all of the surfaces of the battery submodule and arranged into a battery module (e.g., onto the carrier plate) within each of the individual casings.

Conventional battery modules or battery systems generally require a plurality of custom designed parts, such as carrier plates, side plates, carrier beams, and the like, to achieve sufficient mechanical integration, and a plurality of connection devices is required for connecting the different parts to each other. As a consequence, conventional battery modules generally have a high resulting weight, high complexity, and require a lot of installation space.

It is thus an object of embodiments of the present invention to overcome or reduce at least some of the drawbacks of the prior art and to provide a battery module carrier that allows for a simple and lightweight battery system with reduced installation space.

SUMMARY

Further aspects of the present invention will be apparent from the dependent claims, the attached drawings, and/or the following description.

According to a first aspect or embodiment of the present invention, a battery module carrier is provided and includes an H-beam with an upper flange, a web, and a lower flange. For example, the battery module carrier according to an embodiment of the present invention includes (e.g., includes as a primary component) the H-beam. The H-beam includes (e.g., the modifications to the H-beam include) one or more first coolant hollows (e.g., a first coolant passages or openings) arranged in the upper flange and extending along the entire length of the upper flange in a longitudinal or length direction of the H-beam and one or more second coolant hollows (e.g., second coolant passages or openings) arranged in the web and extending along the entire length of the web in the longitudinal direction of the H-beam. By providing such coolant hollows (e.g., hollows within the H-beam that are fluid tight for a suitable coolant and through which the suitable coolant may flow along the entire length of the H-beam), the H-beam is suitable to be used as a battery module carrier. Such H-beams may be relatively easily produced and provide the load capacity and surface area for assembling multiple battery modules thereto in a space efficient configuration. The coolant hollows may further include coolant ducts disposed in the coolant hollows, and the coolant ducts may be made from the same or a different material than the H-beam.

In one embodiment of the present invention, the H-beam includes one or more third coolant hollows (e.g., third coolant passages or openings) arranged in the lower flange and extending along the entire length of the lower flange in the longitudinal direction of the H-beam. Thus, heat transport away from battery modules attached to the battery module carrier is even more efficient. Further, by providing coolant hollows in the upper flange, the web, and the lower flange, the weight of the H-beam is reduced. Generally, the upper flange and the lower flange are at least substantially plane-parallel and connected to each other by the web that extends in a direction substantially parallel to a normal vector of each of the upper flange and lower flange (e.g., extends in a height direction of the H-beam). In one embodiment of the present invention, the upper flange and the lower flange are at least substantially congruent in size, and the web divides each of the lower flange and the upper flange into two equal or substantially equal halves.

In one embodiment, the upper flange includes one or more upper openings (e.g., upper through-holes) fluidly connected to the first coolant hollows. For example, the upper flange includes an opening that extends through an upper surface of the upper flange into the first coolant hollows (e.g., from a first surface of the upper flange to a second surface opposing the first surface of the upper flange). The upper openings are configured to fluidly connect ones of the first coolant hollows to an external coolant circuit, respectively. The first coolant hollows of a plurality of the H-beams may be connected to each other in series such that the H-beams may be arranged adjacent each other in the longitudinal direction of the H-beams and/or arranged in a dense packing configuration in a width direction of the H-beams (e.g., in a direction perpendicular to the longitudinal direction and to the height direction of the H-beam).

In some embodiments, the lower flange includes one or more lower openings (e.g., lower through-holes) fluidly connected to the one or more third coolant hollows. For example, the lower flange includes an opening that is formed to penetrate the inside of the lower flange along the longitudinal direction of the lower flange (e.g., from a first surface of the lower flange to a second surface opposing the first surface of the lower flange). The lower openings are configured to fluidly connect the third coolant hollows to an external coolant circuit, respectively. The lower openings provide the same or substantially the same features as the upper openings. In some embodiments, the web includes one or more coolant ports (e.g., a coolant inlet port and a coolant outlet port), configured for connecting the second coolant hollows to an external coolant circuit. For example, by using the upper openings in the upper flange, the lower openings in the lower flange, and the coolant ports in the web, the first coolant hollows, the second coolant hollows, and the third coolant hollows may be decoupled from each other (e.g., may be fluidly independent from each other) and parallel cooling may be realized (e.g., each of the first coolant hollows, the second coolant hollows, and the third coolant hollows may be separately connected to an external coolant circuit). Parallel cooling is less prone to errors and interconnections between the various coolant hollows can be reduced or minimized.

According to other embodiments of the battery module carrier, the second coolant hollows are fluidly connected to at least one of the first coolant hollows and the third coolant hollows. For example, at least two of the coolant hollows may be connected to each other so as to form a single cooling channel (e.g., a continuous cooling channel) extending through the entire H-beam. According to this embodiment, only one external coolant port may be provided to fluidly connect the interconnected cooling hollows to an external cooling circuit. This allows for relatively easy integration of the battery module carrier in a surrounding system, such as in a vehicle, and/or relatively dense packing efficiency of multiple battery module carriers. In one embodiment, all three coolant hollows, that is, the first, second, and third coolant hollows, are interconnected within the H-beam. In other embodiments, the first and second coolant hollows or the third and second coolant hollows are interconnected while the remaining third or first coolant hollow, respectively, is in fluid connection with an individual coolant port (or coolant ports) for connection to an external coolant circuit.

The at least two interconnected coolant hollows may be fluidly connected to each other by one or more internal passages extending in a direction perpendicular to the longitudinal direction and perpendicular to the width direction of the H-beam (e.g., in the height direction of the H-beam). The internal passages connect a first internal surface (e.g., an internal surface of the first cooling hollows) with a second internal surface opposing the first internal surface (e.g., an internal surface of the second coolant hollow). The internal passages may be provided by assembling the H-beam from a plurality of separate parts (e.g., from an upper flange and a combined or monolithic web and lower flange). Then, each component includes one or more openings on a top or a bottom surface thereof, respectively, that extend into the respective cooling hollow, and the openings may be superimposed with each other in the assembled state of the H-beam. Thus, the coolant hollows of the assembled components are in fluid connection with each other. In other embodiments, the H-beam may be extruded as a monolithic part using an extrusion matrix with movable elements. In other embodiments, the plurality of the coolant hollows may be fluidly connected to each other via a front plate attached to a front face of the H-beam and/or via an end plate attached to an end face of the H-beam.

In a further embodiment of the battery module carrier according to the present invention, the upper flange and the lower flange are spaced from each other (e.g., spaced apart from each other) in the height direction of the H-beam such that a plurality of battery modules may be disposed between the upper flange and the lower flange on both sides of the web. Further, the lower flange extends in the width direction of the H-beam such that the plurality of battery modules may be disposed on the lower flange on both sides of the web and/or a plurality of battery modules may be mounted to a lower surface of the lower flange (e.g., to a surface of the lower flange opposite to a surface thereof contacting the web of the battery module carrier). For example, the H-beam is configured and sized such that a plurality of battery modules may be disposed on the lower flange and between the upper and lower flanges on both side of the web without protruding beyond one of the upper and lower flanges in the width direction of the H-beam.

In some embodiments, the upper flange extends in the width direction of the H-beam such that an additional plurality of battery modules may be disposed on the upper flange. Thus, a high number of battery modules may be disposed on the battery module carrier in a space efficient manner. Further, at least one of the upper flange, the lower flange, and the web includes a connector (e.g., a connection device or connection means) configured to receive a complimentary attachment device (e.g., attachment means) of a respective battery module attached thereto. For example, the H-beam may be further modified to be configured to have a plurality of battery modules attached or fixed to the components thereof.

In some embodiments, at least one of the upper flange, the web, and the lower flange is an extruded profile. According to such embodiments, the H-beam includes a plurality of components that are individually manufactured by extrusion and later assembled, for example, by welding, to form the H-beam. Such embodiments allow for a relatively simple manufacturing process of the components while features, such as the internal openings for fluidly connecting at least two of the cooling hollows to each other, are easily realized. In other embodiments, the H-beam as a whole is an extruded profile. For example, the H-beam is manufactured as a monolithic component. In such embodiments, the H-beam has improved mechanical integrity and stability, while the features, such as the internal openings for fluidly connecting at least two of the cooling hollows, may still be realized by, for example, using an adequate extrusion matrix (e.g., an extrusion matrix having components that are moveable during extrusion). Further, a plurality of battery module carriers, according to an embodiment of the present invention, may be connected to each other to from a double-H profile to increase the number of battery modules that may be attached to thereto.

Another aspect or embodiment of the present invention relates to a battery system including a battery module carrier according to an embodiment of the present invention as described above. The battery system further includes a first plurality of battery modules that is disposed between the upper flange and the lower flange on a first side of the web and a second plurality of battery modules disposed between the upper flange and the lower flange on a second side of the web.

In some embodiments, the battery system includes a first side cover attached to at least one of the upper flange and the lower flange on the first side of the web. The first side cover may be fixed to the upper flange and/or to the lower flange, for example, by screws, or may be moveably coupled thereto, for example, by a hinge connection. The first side cover is configured to cover the first plurality of battery modules. Further, the battery system may include a second side cover that is attached to at least one of the upper flange and the lower flange on the second side of the web, similar to the first side cover, and may be configured to cover the second plurality of battery modules. The battery system according to embodiments of the present invention includes at least two pluralities of battery modules that are arranged in a space efficient manner and that are cooled at least at their top surfaces via the first coolant hollows and at their side surfaces via the second coolant hollows.

In some embodiments, the battery system further includes a third plurality of battery modules disposed on top of the upper flange. Thus, the amount of battery modules in the battery system may be further increased and the mechanical stability of the battery module carrier is further increased. Further, a top cover may be attached to the upper flange and may cover the third plurality of battery modules. The top cover may include a deep-drawn sheet (e.g., a deep-drawn metal sheet) that is configured to enclose the third plurality of battery modules. The deep-drawn metal sheet provides protection to the battery modules and other components and provides a large heat-exchange surface for efficiently radiating heat away from the batteries in the battery modules.

Further, the battery system may include a fourth plurality of battery modules mounted to a lower surface of the lower flange (e.g., to a surface of the lower flange that is opposite to the surface contacting the web). Thus, the amount of battery modules in the battery system may be further increased and the mechanical stability of the battery module carrier may be even further increased. Further, a bottom cover may be attached to the lower flange and may cover the fourth plurality of battery modules. The bottom cover may include a deep-drawn sheet (e.g., a deep-drawn metal sheet) that is configured to enclose the fourth plurality of battery modules.

According to some embodiments, the battery system further includes a control electronics assembly including, for example, a battery management unit (BMU) and/or a battery disconnect unit (BDU) and that is disposed between the upper flange and the lower flange on at least one side of the web. The control electronics assembly may be electrically and/or electronically connected to at least one of the first plurality, the second plurality, the third plurality, and the fourth plurality of battery modules. An "electrical connection" refers to a connection configured for power transmission, while an "electronic" connection refers to a connection configured for signal transmission. Further, the control electronics assembly may include one or more power ports (e.g., a port or ports configured for connection to an external power circuit) and/or one or more signal ports (e.g., a port or ports configured for connection to an external control unit). According to such embodiments, the battery system may be fully integrated with respect to cooling, power transmission, and signal transmission and, thus, provides many functionalities for the operation of the battery modules in a space efficient manner.

The battery system according to embodiments of the present invention may further include one or more front plates attached to a front face of the H-beam and/or one or more end plates attached to an end face of the H-beam. Each of the front plates and the end plates may include a plurality of plate segments. In some embodiments, a plurality of H-beams are arranged in series. In such embodiments, the battery system may include only one of the front plate and the end plate, and the H-beams may be connected to each other in series with respect to at least one of the first coolant hollow, the second coolant hollow, and the third coolant hollow. The battery system may include a front plate and an end plate covering a front face and an end face of the H-beam, respectively, when an isolated battery module carrier is desired. The front plate and the end plate may be configured to provide additional functions in addition to covering the front face and the end face of the H-beam and protecting the battery modules.

According to some embodiments, at least one of the front plate and the end plate is configured to fluidly connect at least one of the first coolant hollow, the second coolant hollow, and the third coolant hollow to an external coolant circuit. For example, at least one of the front plate and the end plate is configured to extend one of the coolant hollows in the longitudinal direction of the H-beam, to seal the respective coolant hollow in all directions other than the longitudinal direction, and further includes a connection device configured to be connected to an external coolant circuit. In such embodiments, at least one of an upper opening and a lower opening, as previously described, may be omitted as the same or substantially the same functionality as they provide may be provided by the front plate and/or the end plate. The second coolant hollow is connected to an external cooling circuit (e.g., an external coolant circuit) via the front plate and/or the end plate.

In other embodiments of the battery system according to the present invention, at least one of the front plate and the end plate is configured to fluidly connect at least two of the first coolant hollow, the second coolant hollow, and the third coolant hollow to each other. For example, at least one of the front plate and the end plate is configured to extend two of the coolant hollows in the longitudinal direction of the H-beam, to redirect them in a direction perpendicular to the longitudinal direction (e.g., in the height direction of the H-beam), and to fluidly connect them with each other. The respective front plate or end plate may include internal coolant channels or may include a recess facing the front face or the end face of the H-beam, respectively, and overlapping with the two coolant hollows.

In other embodiments of the battery system according to the present invention, at least one of the front plate and the end plate is configured to fluid tightly enclose at least one of the first coolant hollow, the second coolant hollow, and the third coolant hollow. For example, the front plate and/or the end plate forms a seal for the coolant hollows. In such embodiments, the upper flange and/or the lower flange may include the openings for connecting the coolant hollows to an external cooling circuit, as described above. In such embodiments, the sealing of the coolant hollows occurs at a sufficient distance from the battery modules such that pouring or leakage of coolant liquid into the battery modules may be avoided.

According to other embodiments of the battery system according to the present invention, at least one of the front plate and the end plate is configured to connect the power port to an external power circuit. The front plate or the end plate may include an opening for guiding the power port of the control electronics assembly through the front plate or the end plate (e.g., the power port may extend through the opening in the front plate or the end plate). In other embodiments, the front plate or the end plate may include an internal power port configured to connect to the power port of the control electronics assembly and an external power port connected to the internal power port and configured to connect to the external power circuit. Further, at least one of the front plate and the end plate may be configured to connect the signal port to an external signal circuit. The front plate or the end plate may include an opening for guiding the signal port of the control electronics assembly through the front plate or the end plate (e.g., the signal port may extend through the opening in the front plate or the end plate). In other embodiments, the front plate or the end plate may include an internal signal port configured to connect to the signal port of the control electronics assembly and an external signal port connected to the internal signal port and configured to connect to an external control unit.

Another aspect or embodiment of the present invention relates a battery module carrier including an H-beam. The H-beam may include one or more first coolant hollows arranged in the upper flange and extending along the entire length of the upper flange and one or more second coolant hollows arranged in the web and extending along the entire length of the web. The H-beam may further include the features as described above with respect to a battery module carrier according to other embodiments of the present invention and may be used in a battery system according to embodiments of the present invention as described above.

BRIEF DESCRIPTION OF THE DRAWINGS

Features of the present invention will become apparent to those of ordinary skill in the art by describing, in detail, exemplary embodiments thereof with reference to the attached drawings, in which.

DETAILED DESCRIPTION

It will be understood that when an element or layer is referred to as being "on," "connected to," or "coupled to"

another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

The control electronics assembly and/or any other relevant devices or components according to embodiments of the present invention described herein may be implemented utilizing any suitable hardware, firmware (e.g., an application-specific integrated circuit), software, and/or a suitable combination of software, firmware, and hardware. For example, the various components of the control electronics assembly may be formed on one integrated circuit (IC) chip or on separate IC chips. Further, the various components of the control electronics assembly may be implemented on a flexible printed circuit film, a tape carrier package (TCP), a printed circuit board (PCB), or formed on a same substrate as the control electronics assembly. Further, the various components of the control electronics assembly may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device or the functionality of a particular computing device may be distributed across one or more other computing devices without departing from the scope of the exemplary embodiments of the present invention.

Figure 1:
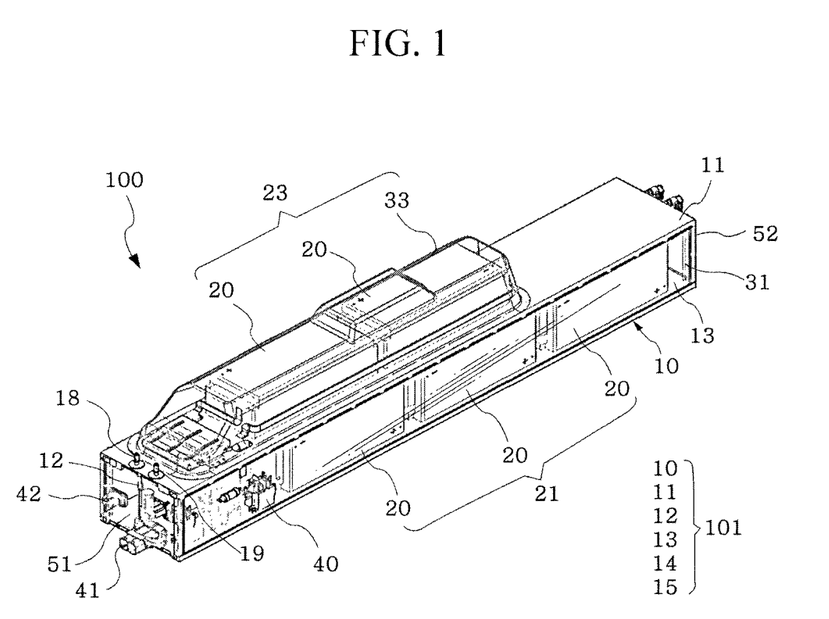
FIG. 1 is a perspective view of a battery system according to an embodiment.
Figure 2:
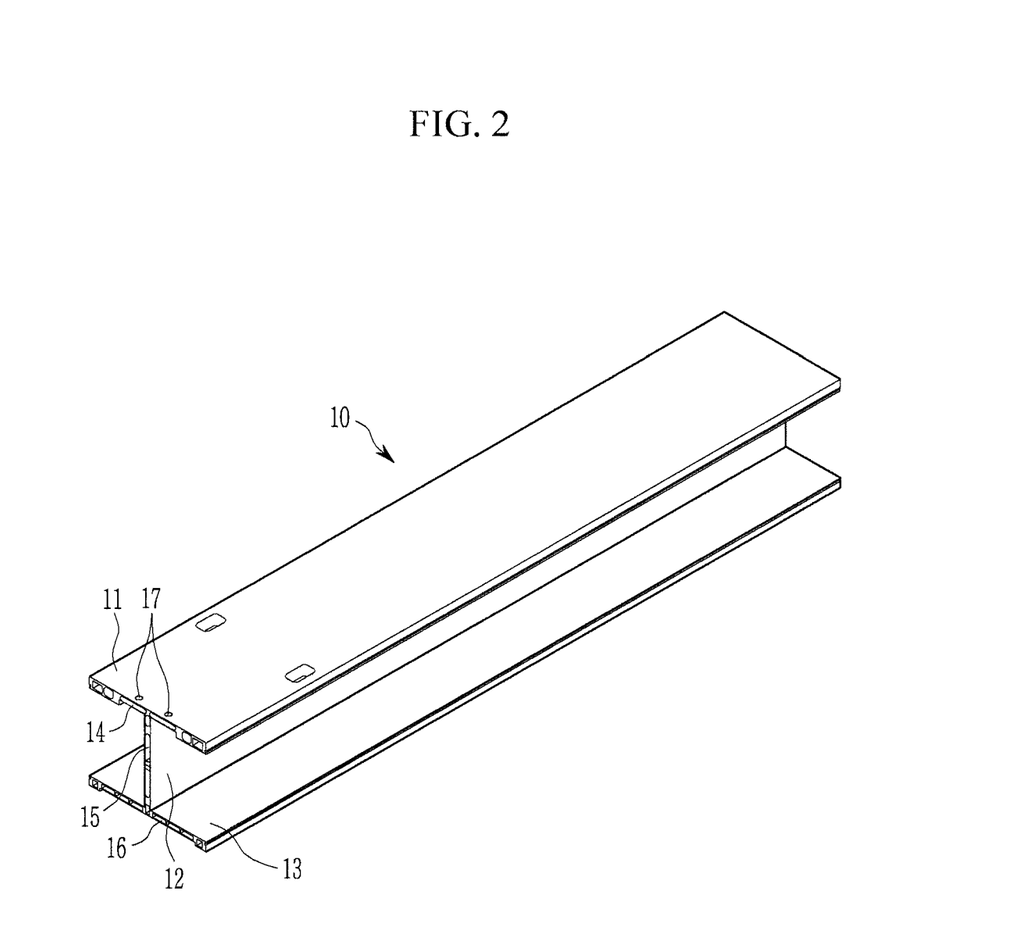
FIG. 2 is a perspective view of an H-beam according to an embodiment.
Figure 3:
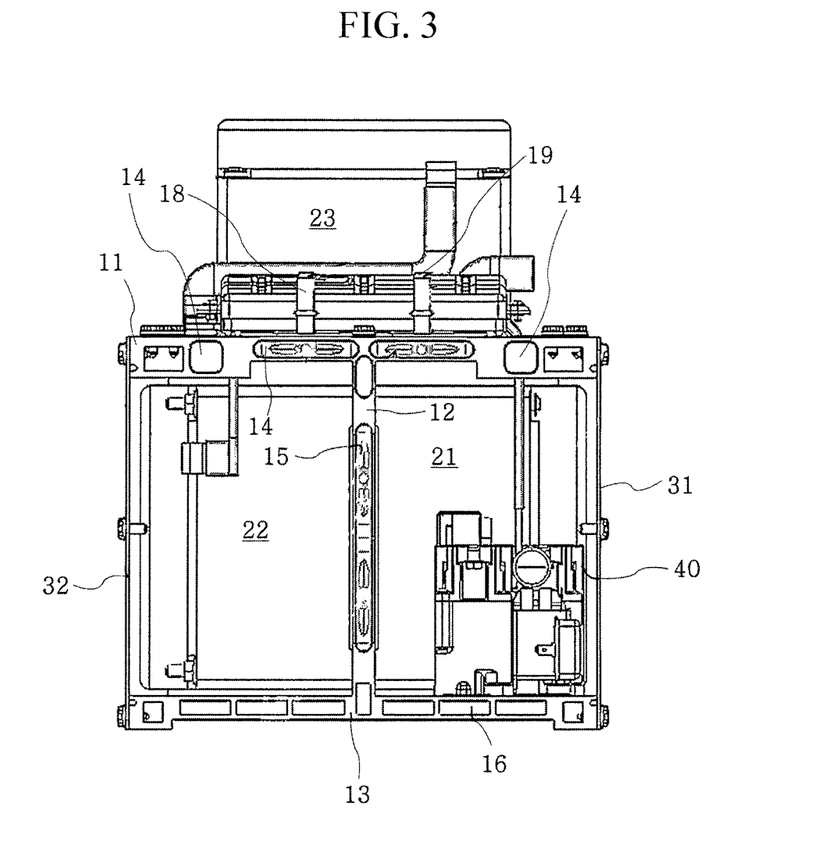
FIG. 3 is a cross-sectional view of the battery system shown in FIG. 1.

Referring to FIGS. 1-3, an exemplary embodiment of a battery system 100 according to an embodiment of the present invention is illustrated. The battery system 100 includes a battery module carrier 101 having an H-beam 10 for mechanical integration of the battery system.

The H-beam 10 includes an upper flange 11, a web 12, and a lower flange 13 that are connected to each other such that a cross-section of the H-beam 10 is H-shaped. As shown in FIGS. 1 and 2, a plurality of first coolant hollows 14 (e.g., first coolant passages or openings) is disposed inside the upper flange 11, with one of the first coolant hollows 14 being on each side of the upper flange 11. The web 12, which connects the upper flange 11 and the lower flange 13, includes a second coolant hollow 15, and the lower flange 13 includes a plurality of third coolant hollows 16. Each of the first coolant hollows 14, the second coolant hollow 15, and the third coolant hollows 16 extend across the entire length or substantially the entire length of the H-beam 10.

A plurality of upper openings 17 (e.g., through-holes) is arranged in a top surface of the upper flange 11 and extend through the upper flange 11. Each one of the upper openings 17 is fluidly connected to one of the first coolant hollows 14, and a coolant inlet 18 and a coolant outlet 19 are provided in each of the upper openings 17, so that each one of the upper openings 17 is configured to connect the respective ones of the first coolant hollows 14 to an external cooling circuit (e.g., vehicle cooling system, not shown). The first coolant hollows 14 are fluidly connected to the second coolant hollows 15 via an end plate 52 attached to an end surface of the H-beam 10. The end plate 52 includes a coolant connecting channel connected to each of the first coolant hollows 14 and to the second coolant hollow 15. The second coolant hollow 15 is fluidly connected to the third coolant hollows 16 via a front plate 51 attached to a front surface of the H-beam. The front plate 51 includes a plurality of coolant connecting channels connected to the second coolant hollow 15 and to each of the third coolant hollows 16.

A first plurality 21 (e.g., a first group) of battery modules (e.g., three battery modules) 20 is disposed on the lower flange 13 and between the upper flange 11 and the lower flange 13 on a first side of the web 12 (right side in the figures). A second plurality 22 (e.g., a second group) of battery modules (e.g., four battery modules) 20 is disposed on the lower flange 13 and between the upper flange 11 and the lower flange 13 on a second side of the web 12 (left side in the figures). The first plurality 21 of the battery modules 20 is covered by a first side cover 31 attached to the upper flange 11 and the lower flange 13 via screws (see, for example, FIG. 2), and the second plurality 22 of the battery modules 20 is covered by a second side cover 32 attached to the upper flange 11 and the lower flange 13 via screws (see, for example, FIG. 2). A third plurality 23 (e.g., a third group) of a plurality of battery modules (e.g., two battery modules) 20 is disposed on the top surface of the upper flange 11 and is covered by a top cover 33 that may be, for example, a deep-drawn metal sheet, and is attached to the upper flange 11 via screws.

A control electronics assembly 40 is disposed on the lower flange 13 near a front surface thereof (e.g., near the front surface of the H-beam) and on one side of the web 12 and is covered by the first side cover 31. The electronics assembly 40 is thus enclosed by (e.g., at least three sides of the control electronics assembly 40 are enclosed by) the web 12, the first side cover 31, and the front plate 51. The control electronics assembly 40 is electrically and electronically connected to each of the first plurality 21, the second plurality 22, and the third plurality 23 of the battery modules 20. The control electronics assembly 40 includes a battery management unit (BMU) and a battery disconnect unit (BDU). The control electronics assembly 40 further includes a power port 41 that is guided through (e.g., extends through) an opening in the front plate 51 to be connected to an external power circuit. The control electronics assembly 40 further includes a signal port 42 that is guided through (e.g., extends through) another opening in the front plate 51 to be connected to an external signal circuit and/or an external control unit.

SOME REFERENCE NUMERALS

10 H-beam
11 upper flange
12 web
13 lower flange
14 first coolant hollows
15 second coolant hollow
16 third coolant hollows
17 upper openings
20 battery module
21 first plurality of battery modules
22 second plurality of battery modules
23 third plurality of battery modules
31 first side cover
32 second side cover
33 top cover
40 control electronics assembly
41 power port
42 signal port
51 front plate
52 end plate
100 battery system
101 battery module carrier

What is claimed is:

1. A battery module carrier comprising:
   an H-beam comprising an upper flange, a web, and a lower flange;
   a first coolant hollow in the upper flange and extending along substantially an entire length of the upper flange in a longitudinal direction of the H-beam; and
   a second coolant hollow in the web and extending along an entire length of the web in the longitudinal direction of the H-beam.

2. The battery module carrier according to claim 1, further comprising a third coolant hollow in the lower flange and extending along substantially an entire length of the lower flange.

3. The battery module carrier according to claim 2, wherein the second coolant hollow is fluidly connected to at least one of the first coolant hollow and the third coolant hollow.

4. The battery module carrier according to claim 2, wherein the lower flange comprises a lower opening fluidly connected to the third coolant hollow.

5. The battery module carrier according to claim 1, wherein the upper flange comprises an upper opening fluidly connected to the first coolant hollow.

6. The battery module carrier according to claim 1, wherein the web comprises a coolant port configured to connect the second coolant hollow to an outer coolant circuit.

7. The battery module carrier according to claim 1, wherein the upper flange and the lower flange are spaced from each other in a height direction of the H-beam such that accommodation spaces are formed between the upper flange and the lower flange on both sides of the web.

8. The battery module carrier according to claim 1, wherein at least one of the upper flange, the web, and the lower flange of the H-beam is an extruded aluminum component.

9. A battery system comprising:
   a battery module carrier comprising:
      an H-beam comprising an upper flange, a web, and a lower flange;
      a first coolant hollow in the upper flange and extending along substantially an entire length of the upper flange; and
      a second coolant hollow arranged in the web and extending along an entire length of the web;
   a first plurality of battery modules between the upper flange and the lower flange on a first side of the web; and
   a second plurality of battery modules between the upper flange and the lower flange on a second side of the web.

10. The battery system according to claim 9, further comprising:
    a first side cover attached to the upper flange and/or the lower flange on the first side of the web and covering a surface of the first plurality of battery modules; and
    a second side cover attached to the upper flange and/or the lower flange on the second side of the web and covering a surface of the second plurality of battery modules.

11. The battery system according to claim 9, further comprising:
    a third plurality of battery modules on a top surface of the upper flange; and
    a top cover attached to the upper flange and covering a surface of the third plurality of battery modules.

12. The battery system according to claim 11, further comprising:

a fourth plurality of battery modules on a bottom surface of the lower flange; and a bottom cover attached to a lower surface of the lower flange and covering a surface of the fourth plurality of battery modules.

13. The battery system according to claim 12, further comprising a control electronics assembly between the upper flange and the lower flange on one side of the web, the control electronics assembly comprises a power port and/or a signal port and is electrically and/or electronically connected to at least one of the first plurality of battery modules, the second plurality of battery modules, the third plurality of battery modules, and the fourth plurality of battery modules.

14. The battery system according to claim 9, further comprising a front plate attached to a front face of the H-beam.

15. The battery system according to claim 14, further comprising further comprising a third coolant hollow in the lower flange and extending along substantially an entire length of the lower flange; and an end plate attached to an end face of the H-beam.

16. The battery system according to claim 15, wherein at least one of the front plate and the end plate is configured to fluidly connect at least one of the first coolant hollow, the second coolant hollow, and the third coolant hollow to an external coolant circuit, wherein at least one of the front plate and the end plate is configured to fluidly connect at least two of the first coolant hollow, the second coolant hollow, and the third coolant hollow to each other, and wherein at least one of the front plate and the end plate is configured to fluid tightly seal at least one of the first coolant hollow, the second coolant hollow, and the third coolant hollow.

17. The battery system according to claim 15, wherein at least one of the front plate and the end plate is configured to fluidly connect at least one of the first coolant hollow, the second coolant hollow, and the third coolant hollow to an external coolant circuit.

18. The battery system according to claim 15, wherein at least one of the front plate and the end plate is configured to fluidly connect at least two of the first coolant hollow, the second coolant hollow, and the third coolant hollow to each other.

19. The battery system according to claim 15, wherein at least one of the front plate and the end plate is configured to fluid tightly seal at least one of the first coolant hollow, the second coolant hollow, and the third coolant hollow.

20. The battery system according to claim 15, wherein one of the front plate and the end plate is configured to fluidly connect at least one of the first coolant hollow, the second coolant hollow, and the third coolant hollow to an external coolant circuit, and wherein the other one of the front plate and the end plate is configured to fluidly connect at least two of the first coolant hollow, the second coolant hollow, and the third coolant hollow to each other.

21. A battery module carrier comprising:

an H-beam comprising an upper flange, a web, and a lower flange;

a first coolant hollow in the upper flange and extending along substantially an entire length of the upper flange;

a second coolant hollow in the web and extending along an entire length of the web; and an end plate connected to the H-beam and comprising a coolant connecting channel fluidly connecting the first coolant hollow and the second coolant hollow to each other.

* * * * *